US008214742B2

(12) United States Patent
Pratt

(10) Patent No.: US 8,214,742 B2
(45) Date of Patent: Jul. 3, 2012

(54) METHOD OF RAPIDLY CREATING VISUAL AIDS FOR PRESENTATION WITHOUT TECHNICAL KNOWLEDGE

(75) Inventor: Allan K. Pratt, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 749 days.

(21) Appl. No.: 12/342,761

(22) Filed: Dec. 23, 2008

(65) Prior Publication Data

US 2010/0162123 A1    Jun. 24, 2010

(51) Int. Cl.
*G06F 3/048* (2006.01)
*G09G 5/00* (2006.01)

(52) U.S. Cl. ......... 715/731; 715/732; 715/275; 345/581

(58) Field of Classification Search .................... 715/713
See application file for complete search history.

(56) References Cited

U.S. PATENT DOCUMENTS

| | | | | |
|---|---|---|---|---|
| 7,051,040 | B2 * | 5/2006 | Easwar ............... | 1/1 |
| 7,051,271 | B1 * | 5/2006 | Chiu et al. ............... | 715/203 |
| 7,263,220 | B2 * | 8/2007 | Crandall et al. ............. | 382/165 |
| 7,632,102 | B2 * | 12/2009 | Macli et al. .................... | 434/421 |
| 7,970,833 | B2 * | 6/2011 | Slobodin ....................... | 709/206 |
| 2003/0235334 | A1 * | 12/2003 | Okubo ........................ | 382/182 |
| 2004/0221237 | A1 * | 11/2004 | Foote et al. ................... | 715/700 |
| 2004/0264775 | A1 * | 12/2004 | Slobodin ....................... | 382/174 |
| 2007/0016853 | A1 * | 1/2007 | Abagyan et al. ............. | 715/515 |
| 2007/0024714 | A1 * | 2/2007 | Kim et al. ................ | 348/207.99 |
| 2007/0106950 | A1 * | 5/2007 | Hutchinson et al. .......... | 715/761 |
| 2007/0222747 | A1 | 9/2007 | Kritt et al. | |
| 2009/0044117 | A1 * | 2/2009 | Vaughan et al. .............. | 715/716 |

OTHER PUBLICATIONS

L. He, Z. Liu, and Z. Zhang, "Why take notes? use the whiteboard system," in Proc. International Conference on Acoustics, Speech, and Signal Processing (ICASSP'03), Hong Kong, Apr. 2003, vol. V, pp. 776-779.
Z. Zhang and L. He, "Whiteboard Scanning and Image Enhancement," Microsoft Research Technical Report, 2003.
http://people.wallawalla.edu/~Rob.Frohne/SaveMyWhiteboard/, retrieved Aug. 6, 2009.
http://www.polyvision.com/ProductSolutions/WhiteboardPhotoSoftware/tabid/284/Default.aspx, retrieved Aug. 6, 2009.
http://www.scanr.com, retrieved Aug. 6, 2009.
http://www.softtouchit.com/products/clearboard/index.html, retrieved Aug. 6, 2009.

\* cited by examiner

*Primary Examiner* — Weilun Lo
*Assistant Examiner* — Amy M Levy
(74) *Attorney, Agent, or Firm* — Kunzler Needham Massey & Thorpe

(57) ABSTRACT

A computer implemented method for capturing and enhancing illustrating pane content for use as sequential slides in a presentation includes illustrating a static image on an illustrating pane in a plurality of colors. Each color used to illustrate the static image representing a single element of the static image. The method further includes digitally capturing a single finished image of the illustrated static image and enhancing the background, geometry and colors comprising the finished image. The single finished image is separated into a plurality of single color images with each single color image comprising only a portion of the single finished image comprising that specific color. A ordered presentation is built from the single colored images and the presentation is displayed.

5 Claims, 3 Drawing Sheets

METHOD OF RAPIDLY CREATING VISUAL AIDS FOR PRESENTATION WITHOUT TECHNICAL KNOWLEDGE

BACKGROUND OF THE INVENTION

1. Field of the Invention

The invention relates to digital slideshow presentations. More specifically, the invention relates to a capturing and enhancing whiteboard content illustrated using conventional manual illustration techniques and converting the illustrations into one or more slides on a digital slideshow.

2. Description of the Related Art

There are many uses for digital slideshows including professional, educational, entertainment and other general communications. Increasingly professional speakers and other presenters use digital slideshows, such as Microsoft's PowerPoint software to help communicate their message. A well organized slideshow enhances a speaker's communication skills by adding a visual element to the oral presentation. Presenters use digital slideshows to illustrate a vast array of visual information which may otherwise be difficult or impossible to communicate through oral presentation alone.

Since the mid 1980's specialized applications running on personal computers have made it possible to create professional looking presentations relatively inexpensively. This technology is becoming increasingly pervasive such that audiences have come to expect some sort of visual presentation to accompany an oral presentation.

Professional speakers and other presenters may use digital slideshows to either supplement or replace older visual aid technology, such as handouts, chalkboards, whiteboards, slides and overhead transparencies. Once created a digital slideshow may be touched up or edited as information comprising the presentation changes. Similarly, additional slides may be added to the digital slideshow as new slides or images become available.

Speakers and presenters without digital design skills are at a disadvantage. Such speakers or presenters must rely on traditional presentation techniques and methods to communicate their messages. These older, traditional presentation techniques and methods are often inferior to digital slideshow technology. Additionally, many presentation facilities lack the infrastructure to use older, outdated visual presentation technology. Accordingly, a need exists for capturing and enhancing whiteboard or other traditional illustrated content using conventional manual illustration techniques and converting the illustrations into one or more slides on a digital slideshow.

SUMMARY OF THE INVENTION

The present invention has been developed in response to the present state of the art, and in particular, in response to the need to capture and enhance whiteboard or other traditional illustrated content using conventional manual illustration techniques and converting the illustrations into one or more slides on an digital slideshow.

A computer implemented method for capturing and enhancing illustrating pane content for use as sequential slides in a presentation is presented. In one embodiment, the method includes illustrating a static image on an illustrating pane with the static image comprising a plurality of colors. Each color represents a single element of the static image illustrated on the illustrating pane. The method includes capturing a single finished image of the illustrated static image on a computer readable medium.

The background of the single finished image is enhanced by converting blank areas of the single finished image on the illustrating pane to a uniform color background regardless of a color tint variation or brightness variation in the single finished image. In one embodiment the geometry of the single finished image is enhanced by correcting a perspective of the single finished image taken from an oblique angle. Each individual color of the single finished image is enhanced by adjusting the colors of the single finished image such that each individual color of the single finished image is uniformly colored regardless of variations in each individual color due to environmental lighting conditions affecting the single finished image.

The single finished image is separated into a plurality of single color images with each single color image comprising only a portion of the original single finished image comprising that specific color. An ordered sequence of single colored images is then built to create a presentation. In certain embodiments the presentation of the ordered sequence of single colored images is then displayed.

In certain embodiments the presentation comprises an animation. In one embodiment the presentation comprises a set of builder slides. In certain embodiments the method includes displaying multiple single colored images simultaneously. In one embodiment, the single colored images are layered such that the images build upon each other.

The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
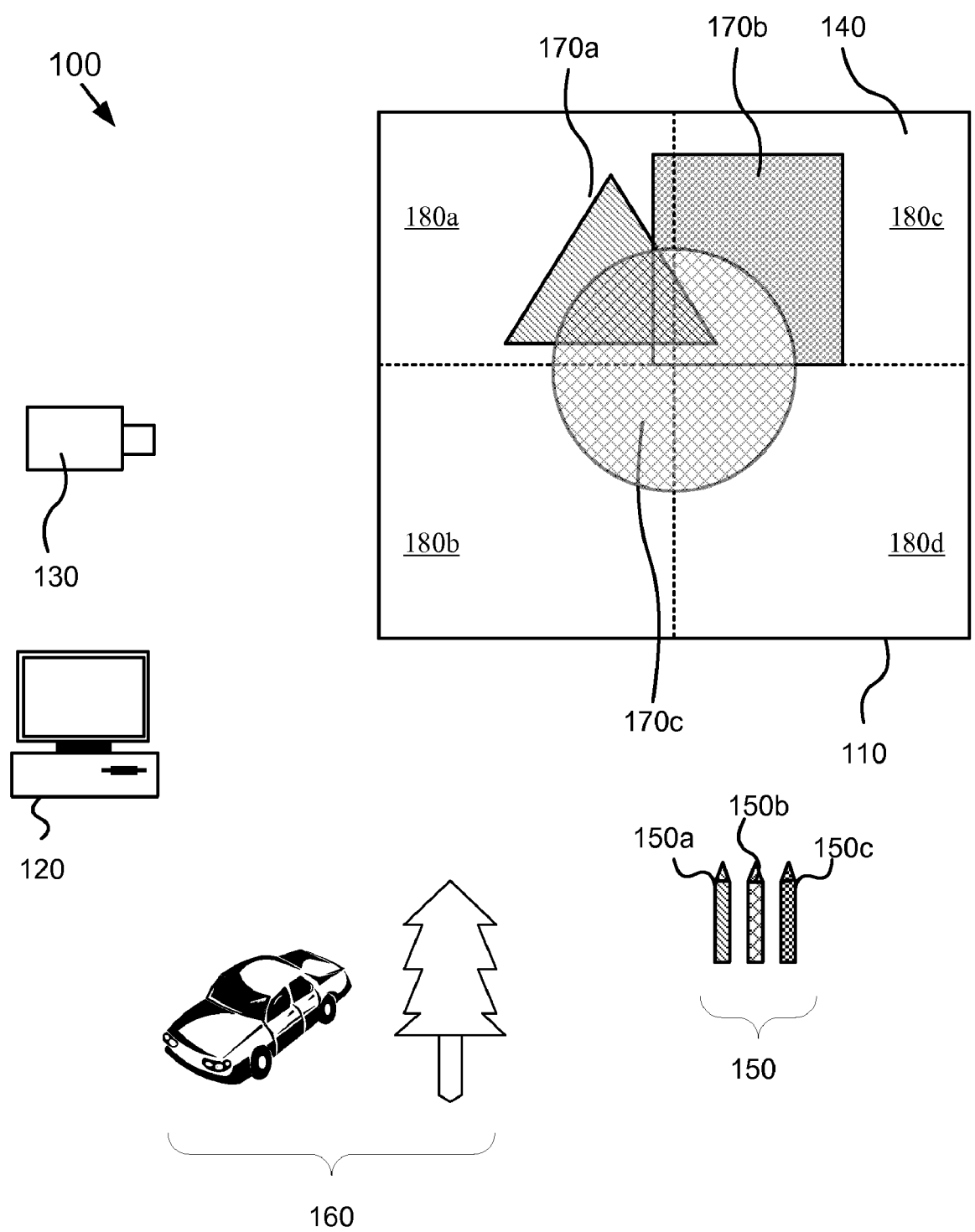
FIG. 1 is a schematic block diagram illustrating a system for capturing and enhancing illustrating pane content for use as sequential slides in a presentation.

It will be readily understood that the components of the present invention, as generally described and illustrated in the figures herein, may be arranged and designed in a wide variety of different configurations. Thus, the following more detailed description of the embodiments of the apparatus of the present invention, as represented in the Figures, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

FIG. 1 illustrates a system 100 for producing digital visual aids for a presentation. The system comprises an illustrating pane 110, a plurality of colored marking devices 150, a computer 120 and a camera 130.

In one embodiment the illustrating pane 110 comprises a front surface 140 for illustrating thereon. In certain embodiments the illustrating pane 110 may comprise a piece of paper, a plastic surface writing material, construction paper or other surface upon which a plurality of different color inks may be disposed. One skilled in the art will recognize that the physical composition of the illustrating pane 110 is not important for the practice of the current invention. Accordingly, the illustrating pane 110 may comprise any surface which will readily receive a plurality of different color inks thereon.

In certain embodiments the illustrating pane 110 is a non-electronic whiteboard comprising a white front surface 140 which may be illustrated upon with colored marking devices 150. In certain embodiments the front surface 140 comprises a uniform color selected to contrast with a plurality of colors.

In certain embodiments a template (not shown) may be permanently illustrated on the front surface 140 of the illustrating plane 110. The template may comprise, for example, a layout grid configured to help a user layout elements of the illustration. In one embodiment the template may comprise a commonly illustrated feature permanently affixed to the front surface 140 of the illustrating pane 110. In one embodiment a plurality of templates 160 may be pre-illustrated and may comprise adhesive backing configured to affix the plurality of templates 160 to the front surface 140 of the illustrating pane 110. In the embodiment illustrated in FIG. 1, the plurality of templates 160 comprise a car and a tree however, one skilled in the art will recognize that a template 160 may comprise any commonly illustrated shape. Thus, the templates 160 illustrating the car and the tree are illustrated as an example only and are not intended to limit the shapes that may comprise the templates 160. By using a pre-illustrated template 160 a user with little or no artistic ability may compose an illustration on the front surface 140 of the illustration pane 110 with relative ease.

In one embodiment the plurality of colored marking devices 150 may be selected to contrast with the front surface 140 of the illustrating pane 110. Each marking device 150 may also be selected to contrast with the other marking devices 150. Thus, in certain embodiments, the colored marking devices 150 are easily distinguishable from one another as well as from the front surface 140 of the illustrating pane 110. In certain embodiments the colored marking devices 150 comprise dry erase markers for illustrating on a whiteboard. In one embodiment the colored marking devices 150 comprise colored pencils for illustrating on paper or other marking surface. One skilled in the art will recognize that that a variety of types of colored marking devices 150 may be used with the current invention. Each colored marking device 150 comprises an individual color as indicated by the shading within colored marking device 150a, 150b and 150c. While three colored marking devices 150 are illustrated, one skilled in the art will recognize that a plurality of colored marking devices 150 may be used with the current invention.

In operation a user illustrates a plurality of shapes illustrated generally as 170a-170c on the front surface 140 of the illustrating pane 110. Each shape 170a, 170b and 170c is illustrated by an individual color corresponding to the color of the colored marking device 150 used to illustrate the shape as indicated by the shading within the shape 170a, 170b and 170c.

In the embodiment illustrated in FIG. 1, the plurality of shapes 170a-170c overlap each other. In certain embodiments each shape 170 may be illustrated such that no overlapping exists. In certain embodiments, prior to any shapes 170 being illustrated on the illustrating pane 110, the illustrating pane 110 may comprise a blank background configured to receive an illustration thereon. Thus, while FIG. 1 illustrates a plurality of predefined areas 180a-180d, one skilled in the art will recognize that in certain embodiments the illustrating pane 110 may comprise a blank background.

In another embodiment, each shape 170 may be illustrated in a predefined area, illustrated generally as 180a-180d, on the front surface 140 of the illustrating pane 110. Thus, by way of example, and in no way limiting, in certain embodiment a shape 170 such as shape 170a may be illustrated in area 180a. Likewise, as an example, in certain embodiments, another shape 170 such as shape 170b may be illustrated in area 180b. In one embodiment, the areas 180a-180d may correspond the sequence of slides in a slideshow. For example, shapes illustrated in area 180a may comprise a first slide of a digital slide show such as a Microsoft Power Point slide show. Likewise, shapes illustrated in area 180b may comprise the second slide of the digital slide show, and so on.

Each slide of the slideshow may comprise only those parts of the input image that are a single color. For example, in certain embodiments the blue parts of the finished image may comprise the first slide or image, the green parts the second, and the orange parts the third. In certain embodiments each color comprising the single finished image may represent any information that is to be presented sequentially or separately such as, for example, the phases of construction. In certain embodiments rather than representing a sequence of slides, each color may represent a single element in an overall system. For example, in certain embodiments different colors could represent different concerns such as jobs for Team A, Team B and Team C.

In one embodiments the separated colored images may comprise individual frames in an animation or the underlying foundation of a builder slide in which elements are sequentially added to the slide. In one embodiment the single colored slides or images may be layered such that multiple single colored slides are displayed simultaneously.

In one embodiment, the color of each shape 170 determines the order of slides in a slide show. Thus, in certain embodiments a first shape 170 such as shape 170b illustrated by a single colored marking device 150 such as colored marking device 150b may comprise the first slide in a digital slide show. A second shape 170 such as shape 170c illustrated by a single colored marking device 150 such as colored marking device 150c may comprise the second slide in the digital slide show, and so on.

Camera 130 may comprise any conventional image capturing device such as a still shot digital camera, conventional 35 mm film camera, digital or conventional motion picture capturing device, etc. Where Camera 130 comprises a convention film camera or motion picture capturing device a scanner (not shown) may be used to convert the image to a digital image. In certain embodiments camera 130 may be permanently affixed at a preconfigured distance from the illustrating pane 110 to eliminate or reduce variations in the image due to variations in lighting at different positions in the area containing the system 100. Similarly, in certain embodiments the camera 130 may be disposed at a predetermined angle in relation to the illustrating pane 110 to eliminate or reduce variations in the image due to camera 130 angles.

Computer 120 may comprise any conventional computing device such as a personal computer, notebook computer, handheld computer, etc. In certain embodiments the camera 130 is directly connected to the computer 120 such that the images taken by camera 130 may be transferred to the computer for processing. In one embodiment the computer may be configured to receive the images on removable storage media (not shown). In certain embodiments the computer may be physically distanced from the system 100 and may receive the images over network.

The computer 120 separates the image into individual images, each image comprising the portion of the overall image illustrated in a single color.

Figure 2:
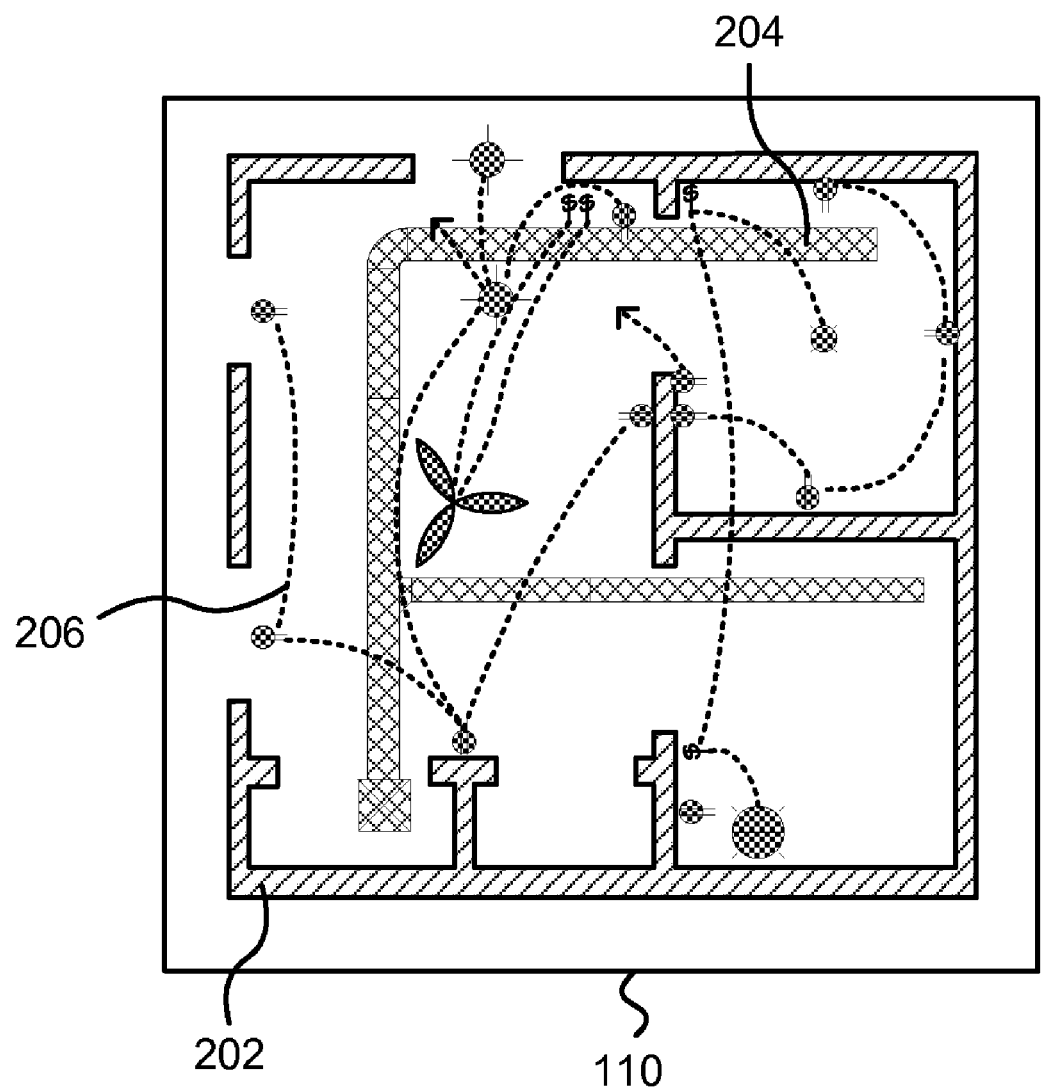
FIG. 2 is a schematic block diagram illustrating a system in which individual components of an overall system are illustrated in different colors on an illustrating pane.

FIG. 2 illustrates another embodiment of the present invention in which the marking devices 150a-150c may be used to illustrate individual components of an overall system on the illustrating pane 110. For example, the embodiment illustrated in FIG. 2 depicts an architectural design including the structure 202, HVAC system 204, and the electrical system 206. The structure 202 such as the exterior and interior walls is illustrated using a single marking device such as marking device 150a. Thus, the depicted structure 202 comprises one color. The HVAC system 204 is illustrated using another marking device such as marking device 150b. Thus, the HVAC system 204 comprises another color. The electrical system 206 is illustrated using another marking device such as marking device 150c and comprises a single color corresponding to the color of marking device 150c. In this manner each component of the overall system may be illustrated in a single color. One skilled in the art will recognize that additional components, such as the plumbing system, mat be illustrated with additional marking devices.

Each component of the overall system may be illustrated in any order the user desires. Thus, in certain embodiments the structure 202 may be illustrated first. In other embodiments the electrical system 206 or the HVAC system 204 may first be illustrated. Each component or parts of each component can be erased and redrawn as necessary to satisfy the illustrator's desires or needs. Once the overall system has been satisfactorily illustrated Camera 130 captures the finished illustration for digital manipulation by the computer 120. The computer 120 then separates the image into layers based on its component colors with each layer comprising a single color. In certain embodiments the computer 120 may create a digital slideshow with each layer representing a single slide. One skilled in the art will recognize that any number of digital manipulations may be performed on the layers once the layers have been separated into the individual slides to create animations or builder slides as is well known in the art.

Figure 3:
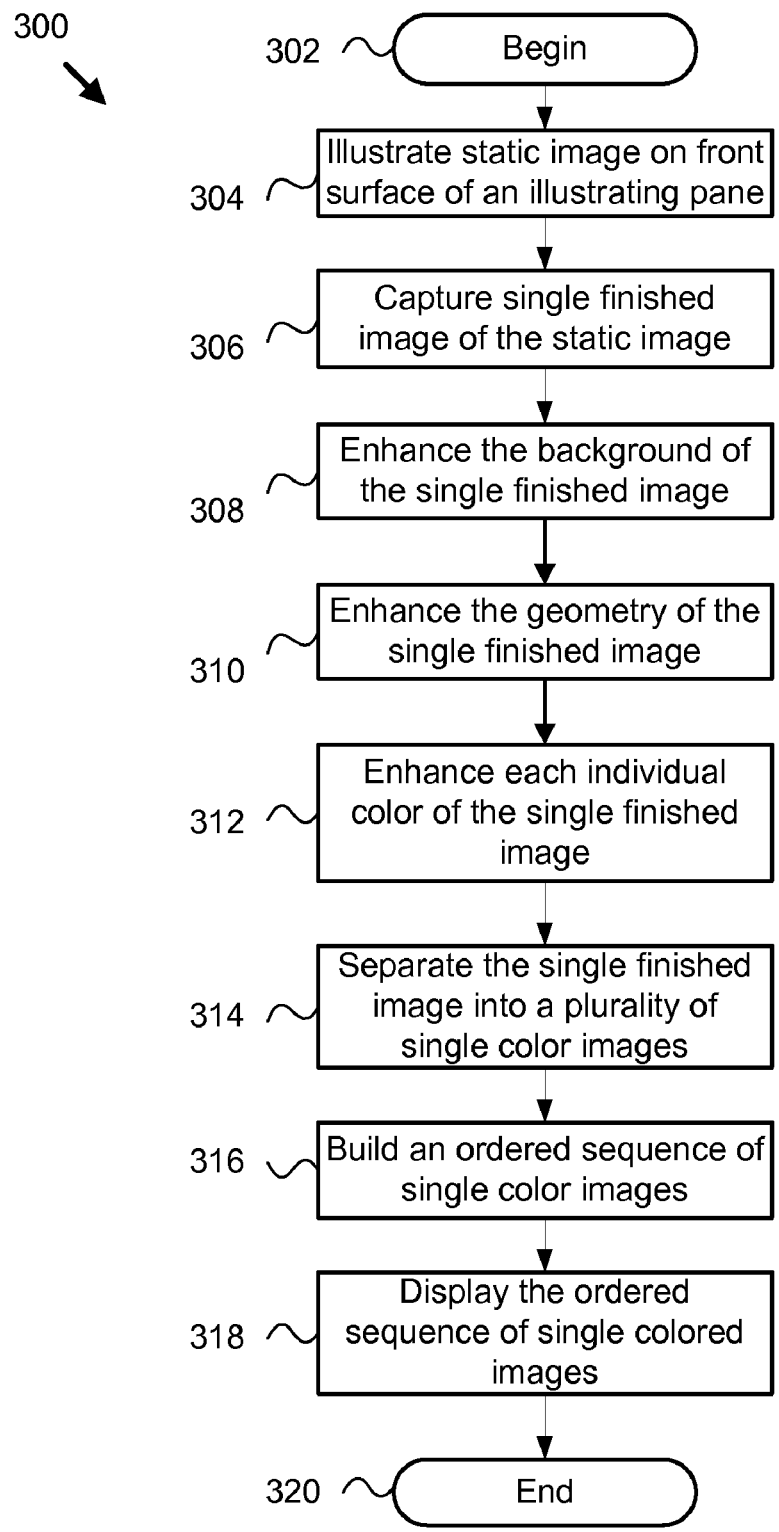
FIG. 3 is a schematic flow chart diagram illustrating one embodiment of a method for capturing and enhancing illustrating pane content for use as sequential slides in a presentation.

The schematic flow chart diagram that follows is generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown FIG. 3 illustrates one embodiment of a flow chart of method 200 for capturing and enhancing whiteboard content for use as sequential slides in a presentation. The method begins 302 by illustrating 304 a static image on the front surface 140 of an illustrating pane 110 using colored marking devices 150. In certain embodiments each color illustrated on the front surface 140 comprises a single frame, element or slide for a digital slideshow. Thus, in certain embodiments the static image comprises a multicolored single image.

When the static image is complete the method continues by capturing 306 the static image as a single finished image. In certain embodiments the capture 306 of the single finished image comprises a digital photograph taken of the single finished image upon completion of the static image. In one embodiment the capture 306 of the single finished image comprises a 35 mm or other film photograph taken of the single finished image upon completion of the static image. Where the capture 306 of the single finished image comprises a 35 mm or other film photograph of the static image the film photograph may be converted to a digital image according to technology well known in the art.

In certain embodiments the background of the digital photograph of the single finished image may then be enhanced 308. Where the capture 306 of the single finished image comprises a 35 mm or other film photograph of the static image the background of the film photograph may enhanced prior to converting the film photograph to a digital image. In one embodiment enhancing 308 the background of the single finished image includes converting blank areas of the single finished image to a uniform color background regardless of color tint variation or brightness variation in the illustrated single finished image.

In certain embodiments the geometry of the single finished image may be enhanced 310 to correct for oblique camera angles. In one embodiment the geometry of the single finished image may be enhanced 310 by straightening lines or replacing familiar shapes with a corresponding predefined shape.

The method continues by enhancing 312 each individual color of the single finished image such that each individual color is uniformly colored regardless of variations in each color due to environmental lighting conditions or color variations in the in comprising the static image. In certain embodiments such color variations may result from different ink concentrations on the static image.

The single finished image is separated 314 into a plurality of single color images, each single color image comprising a shape 170 illustrated as a single color corresponding to the colored marking devices 150. As discussed above, in certain embodiments each shape 170 may comprise a pre-illustrated stencil. One skilled in the art will recognize that the enhancement steps 308-312 as well as the separation step 314 are interchangeable and may occur in any conceivable order. Further, one skilled in the art will recognize that certain steps may be withheld altogether. For example, in certain embodiments the method 200 may omit enhancing the geometry or colors in steps 308-312.

A slideshow may then be built 316 by ordering the single color images into a desired sequence. In certain embodiments the sequence may be predefined according to color. For example, in certain embodiments the color blue may be predefined as corresponding to a first slide, second slide, third slide, etc. in a slideshow. One skilled in the art will recognize that any color could correlate to the first, second, third etc. slide.

In certain embodiments the ordered sequence of single colored images or slides are displayed 318 and the method ends 320. The ordered sequence of single colored images may be displayed 318 on conventional displaying apparatuses such as on a computer screen or other displaying device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer implemented method for capturing and enhancing illustrating pane content for use as sequential slides in a presentation, the method comprising:

illustrating a static image on an illustrating pane, the static image comprising a plurality of colors, each color representing a single element of the static image, each color selected to contrast with each other color in the static image such that each element of the static image is distinguishable from each other element in the static image;

capturing a single finished image of the illustrated static image on a non-transitory computer readable storage medium;

enhancing the background of the single finished image, the background enhancement comprising converting blank areas of the single finished image on the illustrating pane to a uniform color background regardless of a color tint variation or a brightness variation in the single finished image;

enhancing the geometry of the single finished image, the geometry enhancement comprising correcting a perspective of the single finished image taken from an oblique angle;

enhancing each individual color of the single finished image, the individual color enhancement comprising adjusting the colors of the single finished image such that each individual color of the single finished image is uniformly colored regardless of variations in each individual color due to environmental lighting conditions affecting the single finished image;

separating the single finished image into a plurality of single color images, each single color image comprising only a portion of the original single finished image comprising that specific color, wherein each single color image comprises one of the single elements of the static image illustrated in a single color;

building an ordered sequence of single color images, the ordered sequence of colored images comprising a presentation; and displaying the presentation of the ordered sequence of single colored images, wherein the order of the presentation is predefined according to a color of each single color image in the presentation, wherein a first single color image comprising a first color is displayed first and wherein a second single color image comprising a second color is displayed second.

2. The method of claim 1, wherein the ordered sequence of single colored images comprises an animation.

3. The method of claim 1, wherein the ordered sequence of single colored images comprises a builder slide.

4. The method of claim 1, further comprising displaying multiple single colored images simultaneously.

5. The method of claim 4, further comprising layering the single colored images.

* * * * *